(No Model.)
F. GLEASON.
VARIABLE PITCH SPROCKET WHEEL.
No. 484,005. Patented Oct. 11, 1892.
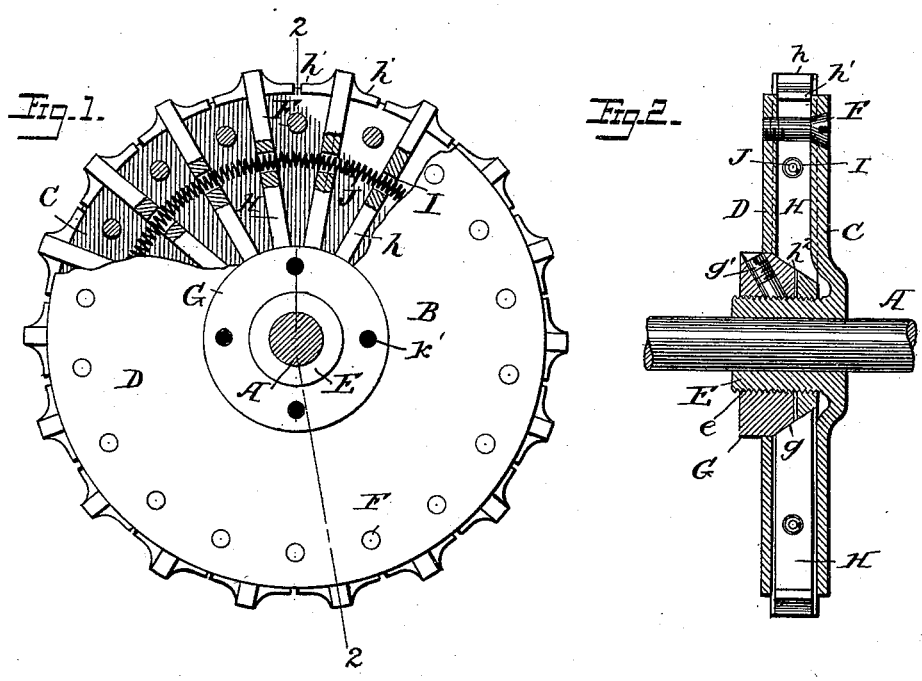
Witnesses
Inventor
F. Gleason
by Foster Freeman
Attorneys

UNITED STATES PATENT OFFICE.

FRANCIS GLEASON, OF PHILADELPHIA, PENNSYLVANIA.

VARIABLE-PITCH SPROCKET-WHEEL.

SPECIFICATION forming part of Letters Patent No. 484,005, dated October 11, 1892.

Application filed November 23, 1891. Serial No. 412,844. (No model.)

*To all whom it may concern:*

Be it known that I, FRANCIS GLEASON, a citizen of the United States, residing in the city and county of Philadelphia, and State of Pennsylvania, have invented certain new and useful Improvements in Variable-Pitch Sprocket-Wheels, of which the following is a specification.

My invention relates to an adjustable or expanding sprocket-wheel, or what may be termed "variable-pitch sprocket-wheels," and while the wheel may be used for various purposes it is intended more especially in the present instance to be used in connection with the driving-chain of Safety bicycles. It is well known that in order to secure the best result it is desirable to have the driving-chain nicely and properly adjusted, and as it often gets loose, owing to wear or stretch of the chain or otherwise, and in this condition it does not operate as smoothly and well as when properly adjusted, it is desirable to provide some means whereby this adjustment may be quickly and easily attained, and it is with this purpose and object in view that my present invention is made.

To these ends my invention consists in a sprocket-wheel adapted for use in connection with chains for bicycles, having the capabilities of adjustment, and constructed and arranged substantially as herein more particularly pointed out.

Referring to the accompanying drawings, Figure 1 is a side view, partially in section, showing one embodiment of my invention. Fig. 2 is a vertical section on the line 2 2, Fig. 1.

Referring more particularly to the drawings, A is the axle or bearing for the sprocket-wheel B, and this wheel is made up of two plates C and D, the former of which has a hub or bearing E, fitting the axle and provided with a thread $e$, while the other plate D may be secured to the plate C by suitable screws or studs F and finds a bearing on the edge of the cone-piece G. This cone-piece is made with an internal diameter and screw-threaded to fit the hub E, while its inner edge is beveled at $g$, and it may further be provided with a set-screw $g'$ for holding the cone-piece in position.

The plates C and D are provided with suitable guides or otherwise arranged to receive the teeth H, and while these teeth may be variously shaped I have shown them as consisting of a body portion arranged to move radially between the plates C and D and having a tooth $h$, provided with lateral extensions $h'$ at its outer end and curved and shaped so as to readily fit the sprocket-chain or other device which is to be passed around the wheel. The lower ends $h^2$ of these teeth, as shown in Figs. 1 and 2, are beveled, so as to form a bearing on the cone-piece G, and it will be seen that by adjusting the cone-piece on its hub the teeth, with their lateral extensions, may be uniformly thrust outward or expanded to the desired degree, and when once adjusted can be securely held in this position.

The teeth may be arranged to slide in the grooves with a greater or less degree of friction, sufficient to prevent their accidental displacement or removal from the wheel; but as an additional safeguard I provide each tooth in the form shown in Figs. 1 and 2 with an opening I, and through these openings a holding device J is passed, which is shown in the form of a coiled spring, and which has a tendency to retain the teeth in position and cause them to bear firmly upon the bevel portion of the cone-piece and to follow the movements or adjustments thereof. The face of the cone is provided with recesses $k'$ for the reception of the spanner, by means of which the cone may be adjusted on the hub to extend or retract the teeth, and it will be seen that with this device the parts can be nicely and readily adjusted to take up or compensate for any wear of the chain, and when adjusted the parts may be secured in position against accidental displacement.

From the above it will be seen that, while I have illustrated the preferred embodiment of my invention, it will be evident to those skilled in the art that the details of construction may be varied without departing from the essential features thereof, and I do not therefore limit myself to the precise construction and arrangement shown.

What I claim is—

1. A variable-pitch sprocket-wheel for bicycles, comprising the parallel plates secured together, one of the plates having formed thereon a screw-threaded hub, sprockets sliding between the plates, a screw-threaded bearing-piece having an inclined conical surface mounted on the hub and arranged to force the teeth outward, and a spring passing through openings in each tooth and arranged to retract the teeth, substantially as described.

2. A sprocket-wheel for bicycles, comprising two parallel plates secured together, the sprocket-teeth arranged between the plates, each tooth consisting of a body portion having a central tooth $h$, provided with lateral extensions $h'$, the extensions being curved and shaped substantially as shown, and for the purpose set forth.

In testimony whereof I have signed my name to this specification in the presence of two subscribing witnesses.

FRANCIS GLEASON.

Witnesses:
BETRAND A. PARKES,
AUGUSTUS LEGGETT.